United States Patent
Ryu et al.

(10) Patent No.: US 11,717,713 B2
(45) Date of Patent: Aug. 8, 2023

(54) BATTERY MODULE WITH IMPROVED SAFETY

(71) Applicant: LG CHEM, LTD., Seoul (KR)

(72) Inventors: Jae-Uk Ryu, Daejeon (KR); Dal-Mo Kang, Daejeon (KR); Su-Chang Kim, Daejeon (KR); Jeong-O Mun, Daejeon (KR); Ji-Su Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 108 days.

(21) Appl. No.: 16/464,781

(22) PCT Filed: Jan. 3, 2018

(86) PCT No.: PCT/KR2018/000139
§ 371 (c)(1),
(2) Date: May 29, 2019

(87) PCT Pub. No.: WO2018/216870
PCT Pub. Date: Nov. 29, 2018

(65) Prior Publication Data
US 2019/0348649 A1    Nov. 14, 2019

(30) Foreign Application Priority Data

May 25, 2017    (KR) .................. 10-2017-0064793

(51) Int. Cl.
*A62C 37/08*    (2006.01)
*A62C 3/16*    (2006.01)
(Continued)

(52) U.S. Cl.
CPC ............ *A62C 37/08* (2013.01); *A62C 3/16* (2013.01); *H01M 10/613* (2015.04);
(Continued)

(58) Field of Classification Search
None
See application file for complete search history.

(56) References Cited

U.S. PATENT DOCUMENTS 6,174,618 B1 * 1/2001 Nishiyama ........ H01M 10/6562
429/100
2007/0164711 A1    7/2007 Kim et al.
(Continued)

FOREIGN PATENT DOCUMENTS

CA    2870239    * 10/2013    ............... A62C 2/06
CN    205564849 U    9/2016
(Continued)

OTHER PUBLICATIONS

Office Action dated Jun. 26, 2020, issued in counterpart Korean Patent Application No. 10-2017-0064793.
(Continued)

*Primary Examiner* — Jonathan Crepeau
*Assistant Examiner* — Angela J Martin
(74) *Attorney, Agent, or Firm* — Morgan, Lewis & Bockius LLP

(57) ABSTRACT

Disclosed is a battery module, which includes: a cell holder having a plurality of battery cell insertion portions and at least one fire extinguishing cell insertion portion; a plurality of battery cells respectively located in the battery cell insertion portions; and at least one fire extinguishing cell located in the fire extinguishing cell insertion portion.

18 Claims, 6 Drawing Sheets

(51) Int. Cl.
- *H01M 50/383* (2021.01)
- *H01M 10/643* (2014.01)
- *H01M 10/613* (2014.01)
- *H01M 50/213* (2021.01)

(52) U.S. Cl.
CPC ....... *H01M 10/643* (2015.04); *H01M 50/213* (2021.01); *H01M 50/383* (2021.01); *H01M 2200/00* (2013.01); *H01M 2200/10* (2013.01)

(56) References Cited

U.S. PATENT DOCUMENTS

| | | | | |
|---|---|---|---|---|
| 2014/0186668 | A1* | 7/2014 | Jung | H01M 10/4207 429/61 |
| 2015/0056482 | A1* | 2/2015 | Kyla-Kaila | A62C 3/16 429/61 |
| 2017/0125755 | A1 | 5/2017 | Kim et al. | |

FOREIGN PATENT DOCUMENTS

| | | | | |
|---|---|---|---|---|
| JP | 09007564 | * | 1/1997 | ............. Y02E 60/10 |
| JP | 2011-146151 A | | 7/2011 | |
| JP | 2014-036714 A | | 2/2014 | |
| JP | 2014-049226 A | | 3/2014 | |
| JP | 2014-144033 | * | 8/2014 | ............. A62C 3/00 |
| JP | 2014-144033 A | | 8/2014 | |
| JP | 2014-229725 A | | 12/2014 | |
| JP | 5760713 B2 | | 8/2015 | |
| JP | 5899420 B2 | | 4/2016 | |
| JP | 2016-081762 A | | 5/2016 | |
| JP | 2017-004959 A | | 1/2017 | |
| KR | 1020040105338 | * | 12/2004 | ............ H01M 10/05 |
| KR | 10-2007-0073173 A | | 7/2007 | |
| KR | 10-2009-0008071 A | | 1/2009 | |
| KR | 10-2009-0026648 A | | 3/2009 | |
| KR | 1020090026648 | * | 3/2009 | ............. H01M 2/34 |
| KR | 10-2015-0084661 A | | 7/2015 | |
| KR | 1020150084661 | * | 9/2016 | ............. H01M 2/20 |
| KR | 10-2017-0051817 A | | 5/2017 | |
| WO | WO 2013036087 | * | 3/2013 | ............ H01M 10/48 |

OTHER PUBLICATIONS

International Search Report dated Jun. 26, 2018, issued in corresponding International Application No. PCT/KR2018/000139.

Office Action dated Jun. 29, 2020, issued in counterpart Japanese Patent Application No. 2019-529196.

Extended European Search Report dated Feb. 24, 2020, issued in counterpart European Patent Application No. 18806763.

* cited by examiner

BATTERY MODULE WITH IMPROVED SAFETY

TECHNICAL FIELD

The present disclosure relates to a battery module with improved safety, and more particularly, to a battery module with improved safety against ignition and explosion by inserting a fire extinguishing cell containing a fire extinguishing agent therein.

The present application claims priority to Korean Patent Application No. 10-2017-0064793 filed on May 25, 2017 in the Republic of Korea, the disclosures of which are incorporated herein by reference.

BACKGROUND ART

As portable electric products such as video cameras, cellular phones and portable PCs are used more broadly, the importance of secondary batteries mainly used as a driving power source therefor is increasing.

A secondary battery capable of charging and discharging, different from a primary battery cannot be recharged is being actively studied in high-tech fields such as digital cameras, cellular phones, laptop computers, power tools, electric bicycles, electric vehicles, hybrid electric vehicles and mass-capacity power storage devices.

In particular, a lithium secondary battery has a high energy density per unit weight and allows rapid charging, compared to other secondary batteries such as lead storage batteries, nickel-cadmium batteries, nickel-hydrogen batteries and nickel-zinc batteries, and thus it is used more and more.

The lithium secondary battery has an operating voltage of 3.6V or above. The lithium secondary battery is used as a power source for a portable electronic device, or a plurality of lithium secondary batteries are connected in series or in parallel and used for a high output electric vehicle, a hybrid electric vehicle, a power tool, an electric bicycle, a power storage device or a UPS.

The lithium secondary battery has an operating voltage three times higher than that of a nickel-cadmium battery or a nickel-metal hydride battery and has a high energy density per unit weight. For this reason, the lithium secondary battery tends to be used more and more.

The lithium secondary battery may be classified into a lithium ion battery using a liquid electrolyte and a lithium ion polymer battery using a polymer solid electrolyte depending on an electrolyte type. In addition, the lithium ion polymer battery may be classified into a pure solid lithium ion polymer battery without containing any electrolyte and a lithium ion polymer battery using a gel polymer electrolyte containing an electrolytic solution, depending on a polymer solid electrolyte type.

In the lithium ion battery using a liquid electrolyte, a cylindrical or rectangular metal can is generally used as a container in a welded and sealed form. Since the can-type secondary battery using the metal can as a container has a fixed shape, there is a disadvantage that it restricts the design of an electric product using the can-type secondary battery as a power source, and it is difficult to reduce the volume. Thus, a pouch-type secondary battery prepared by putting an electrode assembly and an electrolyte in a pouch packaging material made of a film and sealing the pouch packaging material has been developed and used.

However, the lithium secondary battery has a risk of explosion when being overheated and thus it is important to secure safety. The lithium secondary battery is overheated due to various factors, one of which is an overcurrent flow above a limit through the lithium secondary battery. If the overcurrent flows, the lithium secondary battery is heated by the Joule heat, so the internal temperature of the battery rises rapidly. In addition, the rapid rise in temperature causes a decomposition reaction of the electrolyte, causing a thermal runaway, which eventually leads to the explosion of the battery. Overcurrent occurs in the case where a sharp metal object penetrates the lithium secondary battery, where the insulation between positive and negative electrodes is destroyed due to the shrinkage of a separator interposed between the positive and negative electrodes, where a rush current is applied to the battery due to abnormality of a charging circuit or a load connected to the outside, or the like.

Thus, the lithium secondary battery is used in combination with a protecting circuit in order to protect the battery against an abnormal situation such as overcurrent, and the protecting circuit generally includes a fuse element for irreversibly disconnecting a line through which a charging or discharging current flows when overcurrent occurs.

FIG. 1 is a circuit diagram for illustrating an arrangement and an operating mechanism of a fuse element provided in a protecting circuit coupled to a battery pack including a lithium secondary battery.

As shown in FIG. 1, in order to protect the battery pack when overcurrent occurs, the protecting circuit includes a fuse element 1, a sensing resistor 2 for sensing overcurrent, a microcontroller 3 for monitoring the occurrence of overcurrent and operating the fuse element 1 when overcurrent occurs, and a switch 4 for switching the inflow of an operating current to the fuse element 1.

The fuse element 1 is installed on a main line connected to an outermost terminal of the battery pack. The main line refers to a wiring through which a charging current or a discharging current flows. In FIG. 1, it is depicted that the fuse element 1 is installed at a high-potential line (Pack+).

The fuse element 1 is a three-terminal element, where two terminals are connected to the main line through which a charging or discharging current flows and one terminal is connected to the switch 4. In addition, the fuse element 1 includes a fuse 1a connected to the main line in series and melted and cut at a certain temperature and a resistor 1b for applying heat to the fuse 1a.

The microcontroller 3 periodically detects the voltage at both ends of the sensing resistor 2 and monitors whether overcurrent occurs. If it is determined that overcurrent occurs, the microcontroller 3 turns on the switch 4. If so, the current flowing on the main line is bypassed to the fuse element 1 and applied to the resistor 1b. Accordingly, the Joule heat generated at the resistor 1b is conducted to the fuse 1a to raise the temperature of the fuse 1a. If the temperature of the fuse 1a rises to the melting temperature, the fuse 1a is melted and broken so that the main line is irreversibly disconnected. If the main line is disconnected, the overcurrent does not flow any more, thereby overcoming the problem caused by the overcurrent.

However, the above conventional technique has several problems. In other words, if the microcontroller 3 is broken, the switch 4 does not turn on even though overcurrent occurs. In this case, a current does not flow into the resistor 1b of the fuse element 1, and thus the fuse element 1 does not operate. Also, a space for disposing the fuse element 1 is separately required inside the protecting circuit, and a program algorithm for controlling the operation of the fuse element 1 must be loaded in the microcontroller 3. Thus, it is disadvantageous that the space efficiency of the protecting circuit is deteriorated and the load of the microcontroller 3 is increased.

DISCLOSURE

Technical Problem

The present disclosure is designed to solve the problems of the related art, and therefore the present disclosure is directed to providing a battery module structure capable of greatly improving the safety of a secondary battery in use by preventing the occurrence of an event such as ignition and explosion without complicating the structure of the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell holder having a plurality of battery cell insertion portions and at least one fire extinguishing cell insertion portion; a plurality of battery cells respectively located in the battery cell insertion portions; and at least one fire extinguishing cell located in the fire extinguishing cell insertion portion.

The fire extinguishing cell may eject a fire extinguishing agent toward the battery cells at a reference temperature or above.

The fire extinguishing cell may include: an agent tube configured to accommodate a fire extinguishing agent; a tube case configured to accommodate the agent tube through an opening formed in at least one of upper and lower ends thereof and a case cover configured to cover the opening.

The agent tube may be broken at a reference temperature or above so that the fire extinguishing agent is ejected.

The case cover may have a plurality of ejecting portions formed along a periphery thereof.

One fire extinguishing cell insertion portion may be surrounded by a plurality of battery cell insertion portions.

The cell holder may include: an upper holder configured to cover an upper portion of the battery cells and the fire extinguishing cell; and a lower holder configured to cover a lower portion of the battery cells and the fire extinguishing cell.

Meanwhile, a battery pack according to an embodiment of the present disclosure is implemented to include the battery module, and a pack housing configured to accommodate at least one battery module.

Advantageous Effects

According to an embodiment of the present disclosure, it is possible to ensure the safety of a secondary battery in use by greatly lowering the possibility of occurrence of an event such as ignition and explosion of a battery cell provided in a battery module without complicating the structure of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

An overall configuration of a battery module according to an embodiment of the present disclosure and a battery module according to another embodiment of the present disclosure will be described with reference to FIGS. 2 to 4.

Figure 1:
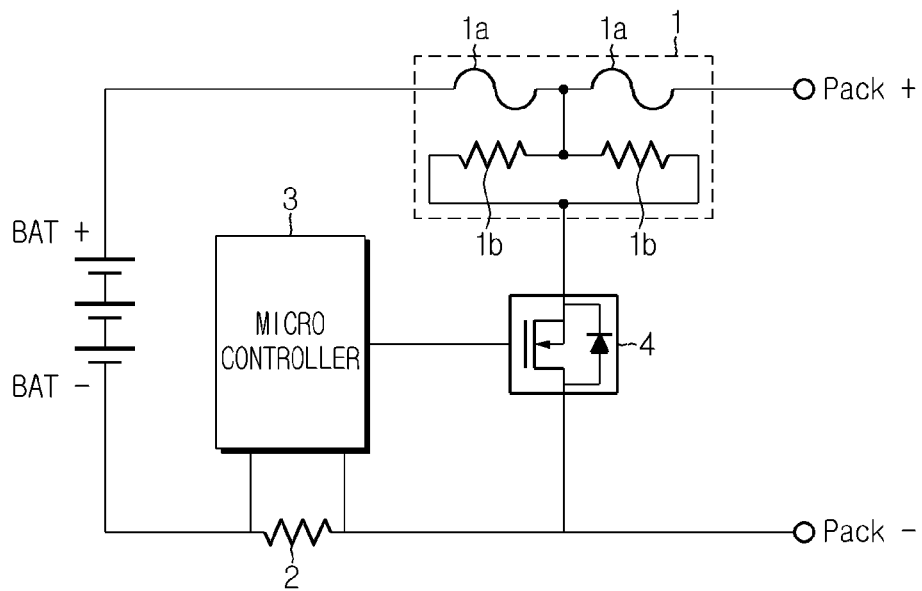
FIG. 1 is a circuit diagram for illustrating an arrangement and an operating mechanism of a fuse element provided in a protecting circuit coupled to a battery module.
Figure 2:
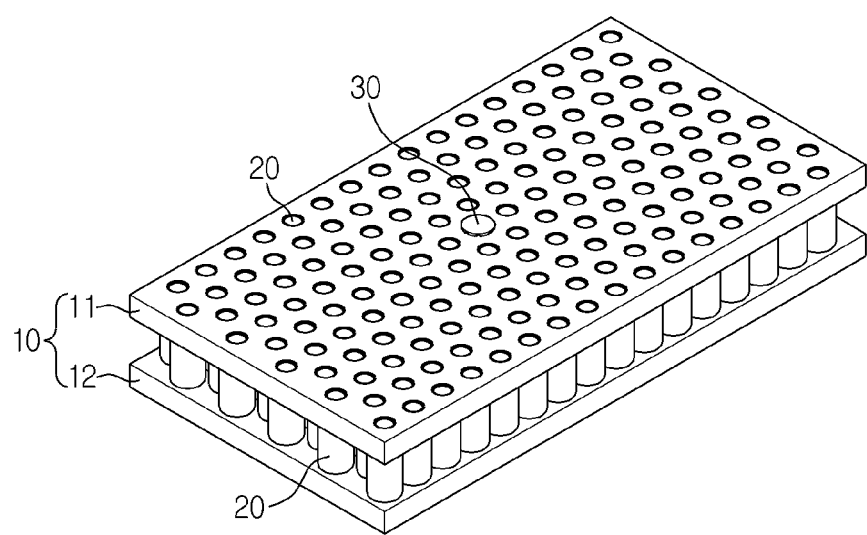
FIG. 2 is a perspective view showing a battery module according to an embodiment of the present disclosure.
Figure 3:
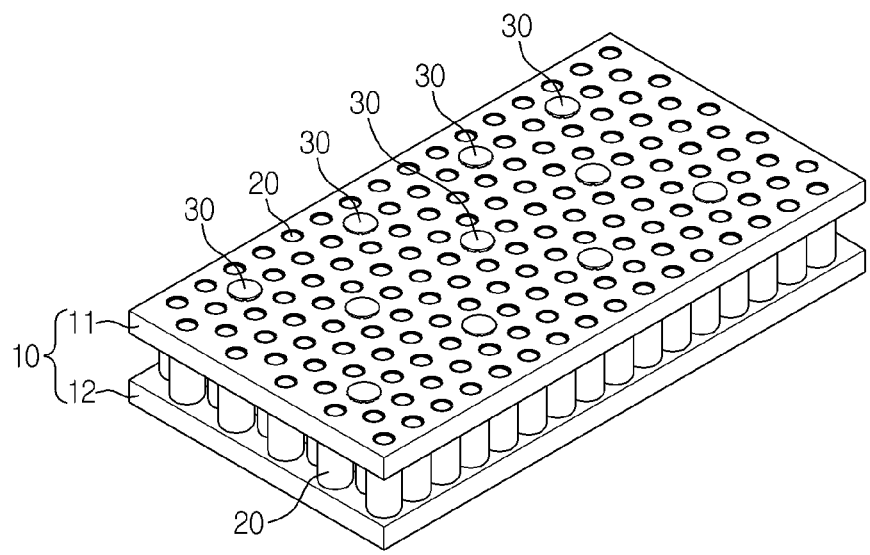
FIG. 3 is a perspective view showing a battery module according to another embodiment of the present disclosure.
Figure 4:
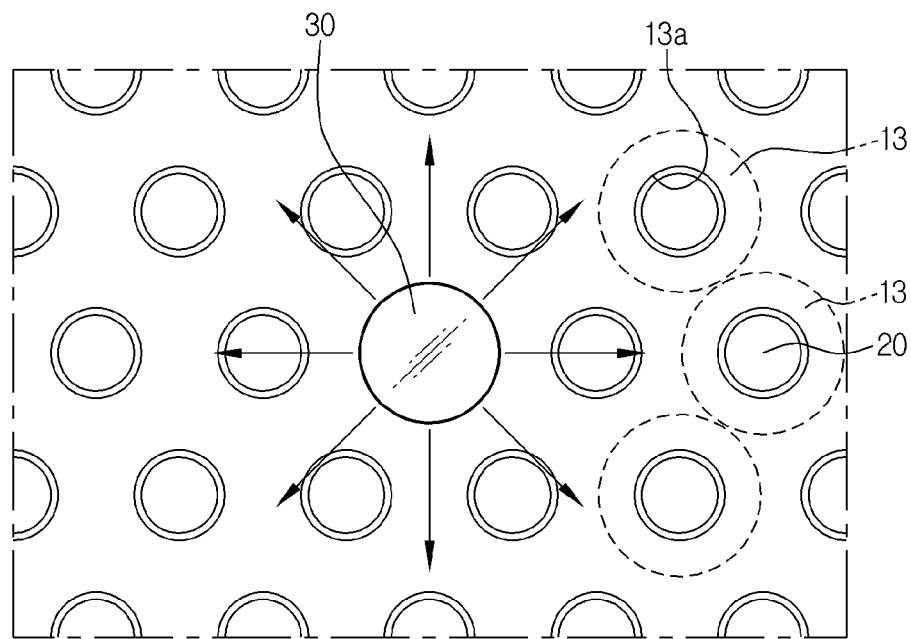
FIG. 4 is a plane view showing the battery module according to an embodiment of the present disclosure.

FIG. 2 is a perspective view showing a battery module according to an embodiment of the present disclosure, FIG. 3 is a perspective view showing a battery module according to another embodiment of the present disclosure, and FIG. 4 is a plane view showing the battery module according to an embodiment of the present disclosure.

First, referring to FIG. 4 together with FIG. 2, the battery module according to an embodiment of the present disclosure may be implemented to include a cell holder 10, a plurality of battery cells 20 inserted into the cell holder 10, and a fire extinguishing cell 30 inserted into the cell holder 10.

The cell holder 10 may include an upper holder 11 covering an upper portion of the battery cells 20 and a lower holder 12 covering a lower portion of the battery cells 12.

However, the cell holder 10 applied to the present disclosure is not necessarily limited to the shape having two pieces and may also have a single integrated holder shape.

The cell holder 10 includes a plurality of battery cell insertion portions 10a into which the battery cells 20 are inserted and at least one fire extinguishing cell insertion portion 10b (see FIG. 7) into which the fire extinguishing cell 30 is inserted.

The battery cell insertion portions 10a and the fire extinguishing cell insertion portion 10b may be formed as a through hole formed through both the upper holder 11 and the lower holder 12, or may be formed as a through hole at the upper holder 11 and as an insert groove at the lower holder 12.

That is, the cell holder 10 may have the battery cell insertion portions 10a in the form of a through hole at both the upper and lower surfaces thereof, or may be shaped so that the lower surface is closed and a through hole is formed only in the upper surface.

The cell holder 10 may include a cell fixture 13 provided to at least one of the upper surface and the lower surface thereof and having a hole 13a with a diameter smaller than the diameter of the battery cell insertion portion 10a. The battery cell 20 may be fixed by the cell fixture 13 so as not to escape to the outside of the battery cell insertion portion 10a, and an electrode terminal of the battery cell 20 may be exposed to the outside through the hole formed in the cell fixture 13. As the electrode terminal of the battery cell 20 is exposed to the outside as above, it is possible to electrically connect the plurality of battery cells 20 to each other by using a bus bar or sense voltages of the plurality of battery cells 20.

The battery cell 20 may be, for example, a cylindrical cell. The battery cell 20 has a diameter corresponding to the diameter of the battery cell insertion portion 10a and thus is inserted into the battery cell insertion portion 10a. In addition, as described above, the battery cell 20 is supported not to deviate from the battery cell insertion portion 10a by means of the cell fixture 13 having the hole with a diameter smaller than the diameter of the battery cell insertion portion 10a.

The plurality of battery cells 20 may be arranged such that battery cells with the same polarity are exposed in the same direction. In this case, electrode terminals of the battery cells 20 exposed through the upper and/or lower surface of the cell holder 10 may be electrically connected through the bus bar so that all the battery cells 20 are connected in parallel.

However, in the present disclosure, the electrical connection among the battery cells 20 is not necessarily limited to the parallel connection, and it is also possible that the battery cells are connected in serial or in a combined form of serial connection and parallel connection.

The fire extinguishing cell 30 has a fire extinguishing agent therein and ejects the fire extinguishing agent evaporated according to temperature rise to the outside, thereby preventing the occurrence of a fire in advance or extinguishing a fire already generated in the battery module.

One fire extinguishing cell 30 may be provided at the center of the battery module as shown in FIG. 2, and alternatively, a plurality of fire extinguishing cells 30 may be provided at regular intervals as shown in FIG. 3.

However, when a plurality of fire extinguishing cells 30 are provided, it is preferable that the battery cells 20 are arranged to surround each fire extinguishing cell 30, rather than that the fire extinguishing cells 30 are arranged continuously, in view of fire extinguishing efficiency.

That is, the cell holder 10 has a plurality of battery cell insertion portions 10a and at least one fire extinguishing cell insertion portion 10b, and when a plurality of fire extinguishing cell insertion portions 10b are provided, the fire extinguishing cell insertion portions 10b are not arranged continuously but preferably arranged so that the periphery of each fire extinguishing cell insertion portion 10b is surrounded by the battery cell insertion portions 10a, in view of fire extinguishing efficiency.

Next, an overall configuration of the fire extinguishing cell 30 applied to the present disclosure and a coupling structure of the fire extinguishing cell 30 and the cell holder 10 will be described in detail with reference to FIGS. 5 to 9.

Figure 5:
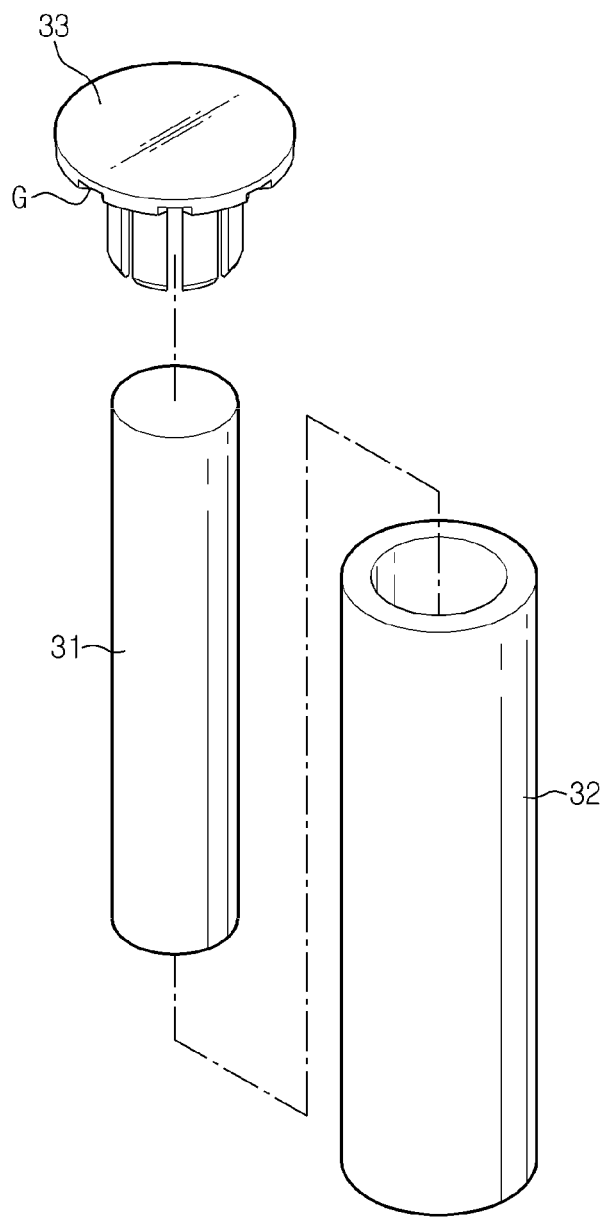
FIG. 5 is an exploded perspective view showing a fire extinguishing cell applied to the battery module according to an embodiment of the present disclosure.
Figure 6:
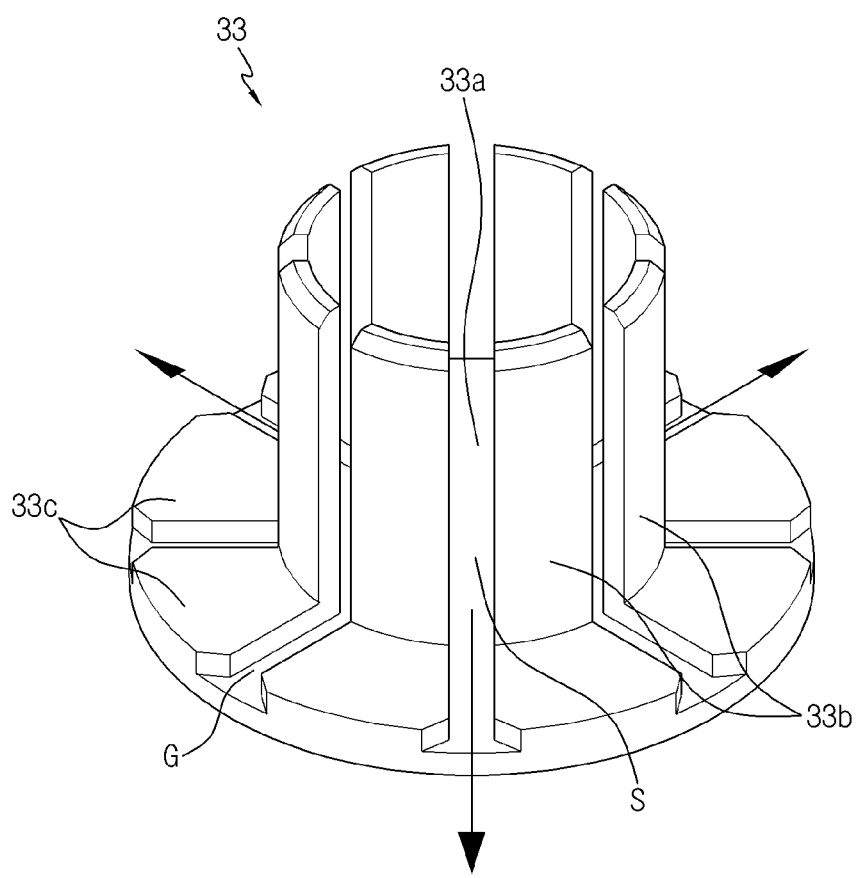
FIG. 6 is a perspective view showing a lower surface of a case cover of a fire extinguishing cell applied to the present disclosure.
Figure 7:
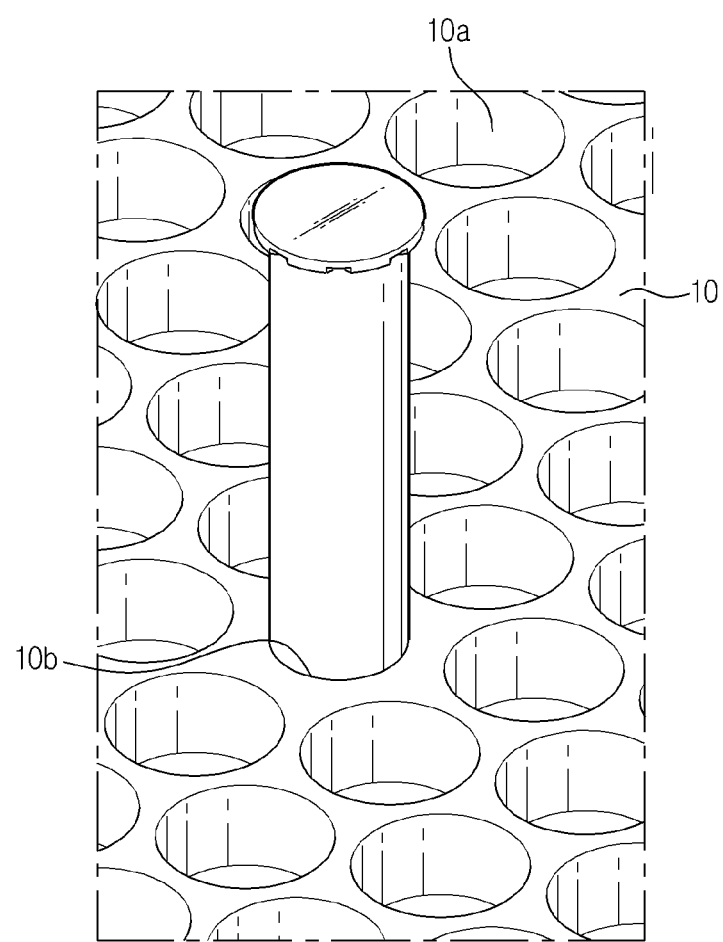
FIG. 7 is a diagram showing a state where the fire extinguishing cell applied to the battery module according to an embodiment of the present disclosure is being inserted into a fire extinguishing cell insertion portion.
Figure 8:
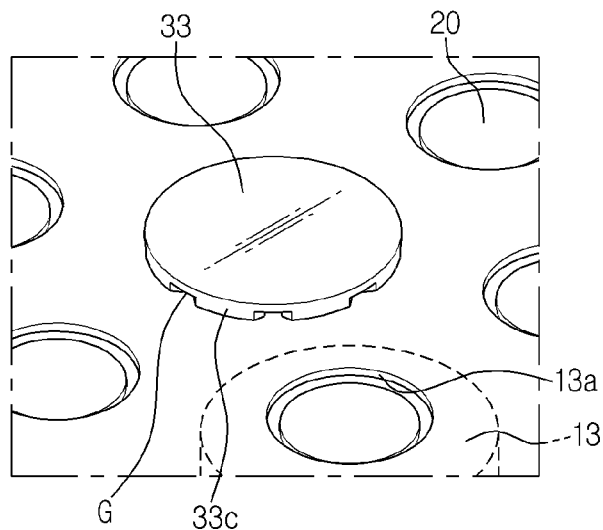
FIG. 8 is a partial enlarged view showing a state where the fire extinguishing cell applied to the battery module according to an embodiment of the present disclosure is inserted into the fire extinguishing cell insertion portion.
Figure 9:
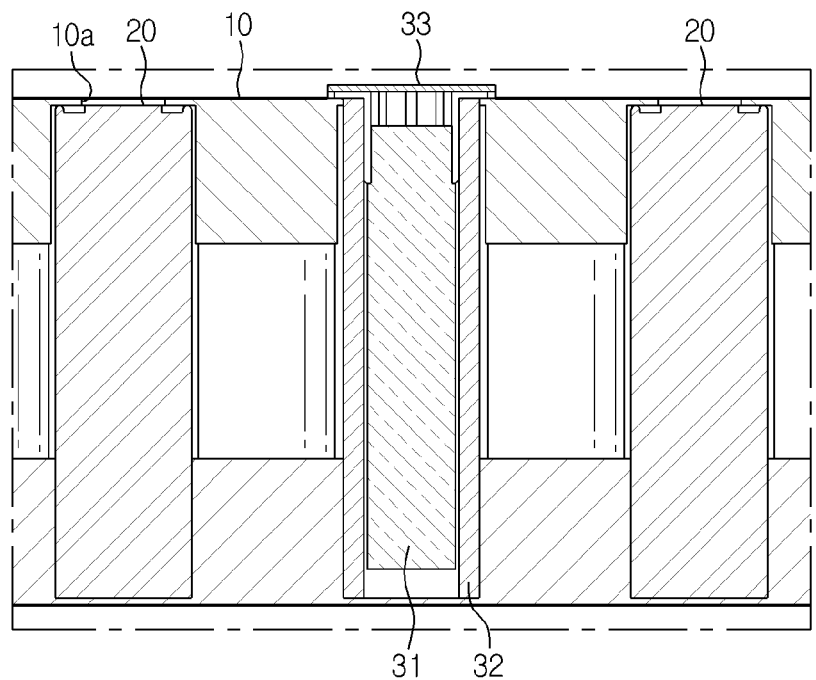
FIG. 9 is a cross-sectioned view showing a state where the fire extinguishing cell applied to the battery module according to an embodiment of the present disclosure is inserted into the fire extinguishing cell insertion portion.

FIG. 5 is an exploded perspective view showing a fire extinguishing cell applied to the battery module according to an embodiment of the present disclosure, and FIG. 6 is a perspective view showing a lower surface of a case cover of a fire extinguishing cell applied to the present disclosure. In addition, FIG. 7 is a diagram showing a state where the fire extinguishing cell applied to the battery module according to an embodiment of the present disclosure is being inserted into a fire extinguishing cell insertion portion, FIG. 8 is a partial enlarged view showing a state where the fire extinguishing cell applied to the battery module according to an embodiment of the present disclosure is inserted into the fire extinguishing cell insertion portion, and FIG. 9 is a cross-sectioned view showing a state where the fire extinguishing cell applied to the battery module according to an embodiment of the present disclosure is inserted into the fire extinguishing cell insertion portion.

Referring to FIGS. 5 to 9, the fire extinguishing cell 30 applied to the present disclosure is implemented to include an agent tube 31, a tube case 32 and a case cover 33.

The agent tube 31 is a tube made of a resin that accommodates the fire extinguishing agent therein. If the temperature of the battery module rises so that the temperature of the space where the agent tube 31 is installed reaches a reference temperature, the agent tube 31 is broken so that the fire extinguishing agent is ejected.

That is, the agent tube 31 corresponds to an accommodating container made of a resin that maintains a sealed state at a normal use temperature of the battery module but is melted and opened at the reference temperature or above.

The fire extinguishing agent accommodated in the agent tube 31 may employ a variety of fire extinguishing agents that are used for common fire extinguishment, regardless of whether its phase is powder, liquid or gas, and its detailed components are also not specially limited. In addition, its fire extinguishing principle is also capable of adopting extinguishment by smothering, cooling fire extinguishment, or both of them.

If the temperature inside the battery module rises to the reference temperature or above and thus the agent tube 31 is melted and broken, the fire extinguishing agent therein is ejected by the strong pressure and spread toward the battery cells 20 disposed around the fire extinguishing cell 30, thereby preventing the occurrence of a fire in the battery module in advance or extinguishing a fire already generated therein. In order to allow the fire extinguishing agent to be ejected out of the broken agent tube 31 at a certain temperature or above, the agent tube 31 may be filled with a gas having a high volume expansion rate according to temperature rise in addition to the fire extinguishing agent. In this case, the gas expanded according to the temperature rise exerts a high pressure to the inner wall of the agent tube 31, and if the temperature reaches a melting point of the agent tube 31, the melted and weakened agent tube 31 is broken so that the fire extinguishing agent is ejected along with the gas filled in the accommodating container.

The tube case 32 is a container for accommodating the agent tube 31, and may be shaped corresponding to the fire extinguishing cell accommodating portion 10b. For example, the tube case 32 may be a cylindrical container having an empty space therein and also an open upper and/or lower portion.

The tube case 32 may be made of a metal material so as to have rigidity to withstand the ejection pressure of the fire extinguishing agent that is ejected at a high temperature.

If the cell holder 10 applied to the present disclosure has a hole for accommodating the fire extinguishing cell 30 at both the upper surface and the lower surface thereof, both the upper and lower portions of the tube case 32 may be open to correspond thereto. Alternatively, if the cell holder 10 has a hole only at the upper surface, only the upper portion of the cell holder may have an open shape to correspond thereto.

If both the upper and lower portions of the tube case 32 are opened, the fire extinguishing agent may be ejected along the upper and lower directions of the tube case 32, and if only the upper portion of the tube case 32 is opened, the fire extinguishing agent may be ejected only along the upper direction of the tube case 32.

Meanwhile, the case cover 33 covers the openings formed at the upper and/or lower portion of the tube case 32 and has a plurality of ejecting portions G formed along the periphery thereof to change an ejecting direction so that the fire extinguishing agent ejected along an extending direction (a first direction) of the tube case 32 is ejected along a direction (a second direction) perpendicular to the extending direction of the tube case 32.

The case cover 33 has a plurality of fixing ribs 33b protruding from a lower surface of a base plate 33a (a surface observed from the inside of the tube case 32) having an approximately circular shape. The plurality of fixing ribs 33b are arranged radially to form a circle having a size corresponding to the fire extinguishing cell accommodating portion 10b formed in the cell holder 10 and are spaced apart from each other by a predetermined distance so that a discharge slit S is respectively formed between adjacent fixing ribs 33b.

Meanwhile, a plurality of support protrusions 33c are formed at outer side of the circle formed by the extension lines connecting the plurality of fixing ribs 33b, and the plurality of support protrusions 33c protrudes from a lower surface of the base plate 33a to a height lower than the protruding height of the fixing ribs 33b so as to form a step on the lower surface of the base plate 33a.

The plurality of support protrusions 33c are formed in a number corresponding to the fixing ribs 33b, and each support protrusion 33c extends from the fixing rib 33b to an outer circumference of the base plate 33a. In addition, the plurality of support protrusions 33c are disposed radially and spaced apart from each other such that an ejecting portion G having a groove shape is respectively formed between adjacent support protrusions 33c.

Due to the above structure of the case cover 33, when the case cover 33 covers the opening of the tube case 32, the fixing ribs 33b are closely adhered to the inner surface of the tube case 32, so that the case cover 33 is fixed to the tube case 32. That is, the case cover 33 may be fixed to the tube case 32 in a fitting manner by means of the fixing ribs 33b. However, in the present disclosure, the coupling of the case cover 33 and the tube case 32 is not necessarily limited to the above fitting manner, and the fixing rib 33b and the tube case 32 may be fixed by forming an adhesive layer between the contact surfaces thereof or coupled by welding.

Meanwhile, when the case cover 33 is coupled to the tube case 32, the support protrusion 33c is closely adhered to the upper surfaces of the tube case 32 and the cell holder 10, and thus the inner space of the tube case 32 communicates with the outside by means of the discharge slit S and the ejecting portion G.

Thus, if the agent tube 31 is broken in the tube case 32 and thus the fire extinguishing agent is ejected, the ejected fire extinguishing agent moves along the length direction of the tube case 32, then moves along a vertical direction different from the length direction at reaches the case cover 33, and is then ejected out through the ejecting portions G, thereby preventing a fire and/or extinguishing the fire of the battery cells 20 disposed around the fire extinguishing cell 30.

Meanwhile, at least one battery module according to the present disclosure as described above may be accommodated in a pack housing to configure a battery pack. When a risk of fire due to an internal temperature rise increases or a fire occurs, in the battery pack prepared as above, it is possible to prevent the occurrence of a fire and/or extinguish a fire that is already generated, by means of the fire extinguishing agent ejected in the pack housing, thereby ensuring safety of a secondary battery in use.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a cell holder comprising a plurality of holes through an upper surface of the cell holder, the holes respectively forming:
      a plurality of battery cell insertion portions; and
      at least one fire extinguishing cell insertion portion;
   a plurality of battery cells respectively located in the battery cell insertion portions; and
   at least one fire extinguishing cell respectively located in the at least one fire extinguishing cell insertion portion,
   wherein the at least one fire extinguishing cell is spaced apart from each of the plurality of battery cells, and does not directly contact any of the plurality of battery cells, and
   wherein the at least one fire extinguishing cell includes a case cover configured to cover one of the holes forming the at least one fire extinguishing cell insertion portion at the upper surface of the cell holder without covering another of the holes forming one of the battery cell insertion portions adjacent to the at least one fire extinguishing cell insertion portion in a plan view.

2. The battery module according to claim 1, wherein:
   the at least one fire extinguishing cell is configured to eject a fire extinguishing agent toward the battery cells at a reference temperature or above;
   the at least one fire extinguishing cell is configured to eject a fire extinguishing agent only from one or both of top and bottom ends of the at least one fire extinguishing cell; and
   the at least one fire extinguishing cell has a solid side surface.

3. The battery module according to claim 1, wherein the at least one fire extinguishing cell includes:

an agent tube configured to accommodate a fire extinguishing agent; and a tube case configured to accommodate the agent tube through an opening formed in at least one of upper and lower ends thereof, the opening corresponding to the one of the holes corresponding to the at least one fire extinguishing cell portion, wherein the case cover is configured to cover the opening.

4. The battery module according to claim 3 wherein the agent tube is configured to break at a reference temperature or above so that the fire extinguishing agent is ejected.

5. The battery module according to claim 3, wherein the case cover has a plurality of ejecting portions formed along a periphery thereof.

6. The battery module according to claim 1, wherein the at least one fire extinguishing cell insertion portion is surrounded by a plurality of adjacent battery cell insertion portions among the battery cell insertion portions.

7. The battery module according to claim 1, wherein the cell holder includes:
an upper holder configured to cover an upper portion of the battery cells and the at least one fire extinguishing cell, the holes extending through the upper holder; and
a lower holder configured to cover a lower portion of the battery cells and the at least one fire extinguishing cell.

8. A battery pack, comprising:
at least one battery module according to claim 1; and
a pack housing configured to accommodate the at least one battery module.

9. The battery module according to claim 1, wherein:
the at least one fire extinguishing cell has a cylinder shape having an extending direction and a width direction perpendicular to the extending direction;
the at least one fire extinguishing cell is configured to eject a fire extinguishing agent only along the extending direction.

10. The battery module according to claim 9, wherein:
the extending direction is a vertical direction; and
the width direction is a length direction.

11. The battery module according to claim 1, wherein the holes forming the battery cell insertion portions and the at least one fire extinguishing cell insertion portion each have respective openings in the same upper surface of the cell holder.

12. The battery module according to claim 7, wherein the holes further extend through the lower holder.

13. The battery module according to claim 7, wherein the holes further extend into the lower holder to respectively form a plurality of grooves in the lower holder.

14. The battery module according to claim 1, wherein the case cover includes a base pate having a larger width than the one of the holes forming the at least one fire extinguishing cell portion in the plan view.

15. The battery module according to claim 14, wherein the case cover further includes a plurality of fixing ribs extending from the base plate along an inner side wall of the at least one fire extinguishing cell portion.

16. The battery module according to claim 15, wherein the fixing ribs are arranged radially to form a circle having a size corresponding to a size of the one of the holes forming the at least one fire extinguishing cell portion.

17. The battery module according to claim 1, wherein the another of the holes is a hole forming a battery cell insertion portion closest to the at least one fire extinguishing cell insertion portion among the battery cell insertion portions.

18. The battery module according to claim 1, wherein the one of the holes forming the at least one fire extinguishing cell insertion portion is spaced apart from the another of the holes forming the one of the battery cell insertion portions adjacent to the at least one fire extinguishing cell insertion portion in the plan view.

* * * * *